United States Patent [19]

Lancor, Jr., deceased et al.

[11] 3,724,343
[45] Apr. 3, 1973

[54] ANALYTICAL PHOTOGRAPHIC EXPOSURE METER

[75] Inventors: Joseph H. Lancor, Jr., deceased, late of Arcadia, Calif. by Ellen B. Lancor, administratrix; Dexter P. Cooper, Jr., Pasadena, Calif.

[73] Assignee: Bell & Howell Company, Chicago, Ill. ; by said Ellen B. Lancor, administratrix

[22] Filed: Aug. 23, 1971

[21] Appl. No.: 173,761

[52] U.S. Cl.................95/10 R, 95/10 PO, 356/219, 356/222
[51] Int. Cl..............................................G01j 1/42
[58] Field of Search ....95/10 C, 10 CE, 10 PO, 10 R, 95/10 B; 356/222, 219

[56] References Cited

UNITED STATES PATENTS

| | | | |
|---|---|---|---|
| 3,224,322 | 12/1965 | Westbrook | 356/222 X |
| 3,413,065 | 11/1968 | Funk | 356/222 O X |
| 3,619,071 | 11/1971 | Kimura | 356/222 |

*Primary Examiner*—Joseph F. Peters, Jr.
*Assistant Examiner*—Michael L. Gellner
*Attorney*—Luc P. Benoit

[57] ABSTRACT

A photographic exposure meter provides a visually observable optical image of a scene and analyses the scene for predetermined light intensities. The exposure meter then provides, within the usually observable image, visually observable indications of presence and location of predetermined light intensities in the scene. An optical scanning device may be employed for aiding in the determination of predetermined light intensities and in the provision of the visually observable indications.

18 Claims, 8 Drawing Figures

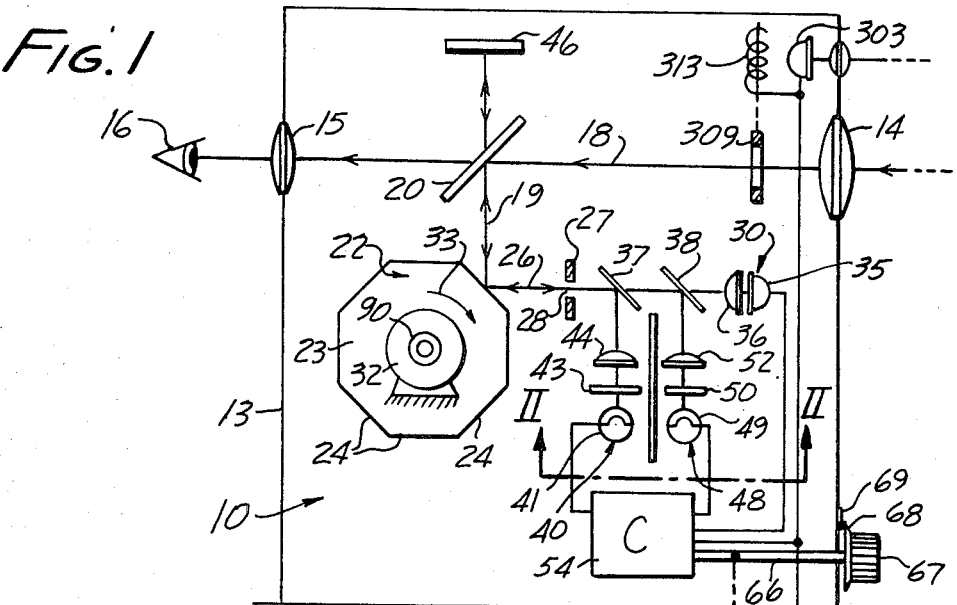
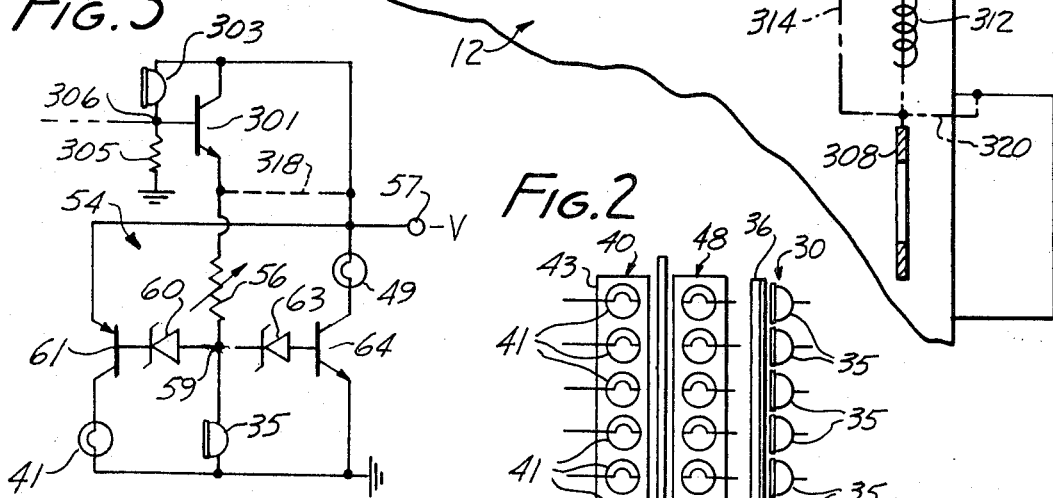
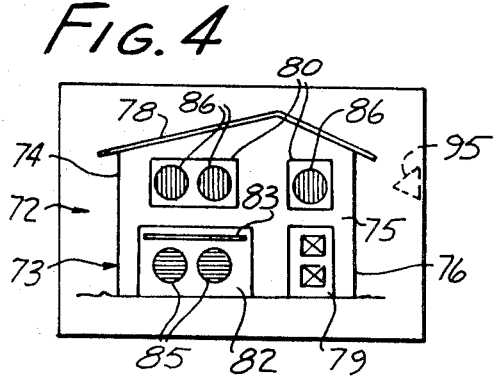

ANALYTICAL PHOTOGRAPHIC EXPOSURE METER

BACKGROUND OF THE INVENTION

1. Field of the Invention

The subject invention broadly relates to photography and, more particularly, to photographic exposure meters.

2. Description of the Prior Art

Most existing photographic exposure meters measure the total light impression emanating from a scene or from a larger part thereof, and are thus not capable of indicating smaller areas of potential overexposure or underexposure within the scene. In recognition of this problem, some exposure meters have been constructed to measure only the light which emanates from a small portion of the scene to be photographed. In consequence, areas of potential overexposure or underexposure outside the small portion of measurement often go undetected at the time the picture is taken.

In an attempt to avoid these problems, some serious professional photographers would make a plan of the scene to be photographed. In this plan, the scene is broken down into a multitude of elemental areas. They would then painstakingly measure the light intensity for each elemental area of the scene and would continuously enter the results of their measurements into their plan to provide tangible data about the exposure profile of the scene to be photographed.

For most photographers, such a procedure is far too cumbersome. Moreover, the procedure just outlined only works with scenes that remain static for longer periods of time.

SUMMARY OF THE INVENTION

The subject invention overcomes the above mentioned disadvantages of existing equipment and techniques, and provides photographic exposure meters which are analytical in their operation, thereby providing visually observable indications of presence and location of predetermined light intensities without the necessity for special plans and incremental light measurements by the photographer.

From one aspect thereof, the subject invention provides a photographic exposure meter which comprises, in combination, first means for providing a visually observable optical image of a scene, second means operatively associated with the first means for analyzing the scene for predetermined light intensities, and third means operatively associated with said first and second means for providing, in the optical image, visually observable indications of presence and location of the predetermined light intensities in the scene.

The expression "optical image" as employed herein is intended to refer to intangible images of the type produced and presented to the eye by optical means. Optical images are thus distinct from tangible images or pictures of the scene, such as those represented by the above mentioned plans.

In accordance with a preferred embodiment of the subject invention, the above mentioned second means preferably include fourth means for scanning the scene, fifth means operatively associated with the fourth means for determining for each scanned portion of the scene the presence of a predetermined light intensity, and said third means include sixth means connected to the fifth means and operatively associated with the fourth means for providing an indication of each determination of the presence of a predetermined light intensity, and for projecting each determination by way of the fourth means into the optical image of the scene provided by the above mentioned first means.

In this manner, it is possible to provide each light intensity indication in the visually observable optical image at a location which corresponds to the location of occurrence of the particular light intensity in the scene to be photographed.

From a related aspect thereof, the subject invention provides a photographic exposure meter for presenting a spatial analysis of areas of potential overexposure and areas of potential underexposure.

This exposure meter comprises, in combination, first means for providing a visually observable optical image of a scene, and second means operatively associated with the first means for analyzing said scene for first areas of potential overexposure and for second areas of potential underexposure, and for providing in areas of the optical image corresponding to the first areas of the scene visually observable indications of potential overexposure, and in further areas of the image corresponding to the second areas of the scene visually observable indications of potential underexposure.

In accordance with a preferred embodiment of the subject invention, the second means defined in the preceding paragraph include again third means for scanning the scene. These second means further include fourth means operatively associated with the third means for determining for each scanned portion of the scene the presence of a potential overexposure and the presence of a potential underexposure, and fifth means connected to the fourth means and operatively associated with the third means for providing a first indication of each determination of the presence of a potential overexposure, and for providing a second indication for each determination of the presence of a potential underexposure, and for projecting each first and second indication into the optical image by way of the third means.

BRIEF DESCRIPTION OF THE DRAWINGS

The subject invention will become more readily apparent from the following detailed description of preferred embodiments thereof, illustrated by way of example in the accompanying drawings, in which:

FIG. 1 is a diagrammatic illustration of an exposure meter according to the subject invention;

FIG. 2 is a view along line II—II OF FIG. 1;

FIG. 3 is a circuit diagram of a control apparatus employed in the exposure meter of FIG. 1;

FIG. 4 is a diagrammatic illustration of an image with exposure indications observable by a user of the apparatus of FIG. 1;

Figure 5:
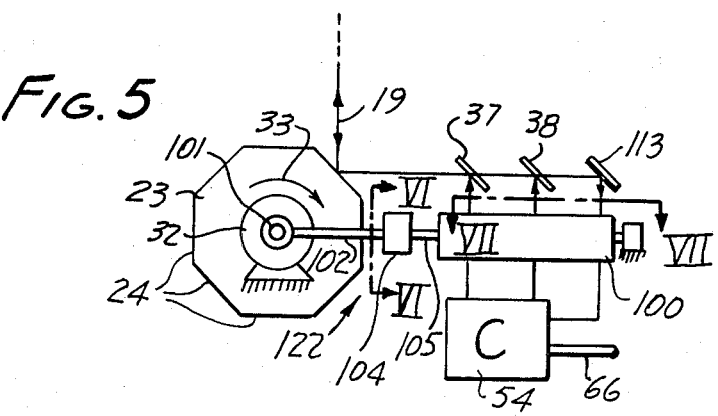
FIG. 5 is a diagrammatic illustration of a first modification of the exposure meter of FIG. 1.

In the accompanying drawings, like reference numerals among different figures designate like or functionally equivalent parts. To avoid cumbersome repetition, a part which appears in two or more FIGS. of the drawings is typically described hereinafter with reference to one of these FIGS. The description of that one FIG. should then be consulted for a fuller understanding of the nature and function of the particular part in the FIGS. in which it appears.

DESCRIPTION OF PREFERRED EMBODIMENTS

FIG. 1 shows a photographic exposure meter 10 in accordance with a preferred embodiment of the subject invention, as well as a photographic camera 12 on which the exposure meter is mounted. The camera 12 may be a still camera or a motion picture camera of conventional design.

The photographic exposure meter 10 has a housing 13 and lenses 14 and 15 for presenting, to the eye 16 of the photographer, a visually observable optical image of the scene to be photographed. A line 18 symbolizes the path from the scene to the eye of the photographer of the luminous impressions which make up the visually observable optical image.

As diagrammatically indicated by a line 19, a conventional beam splitter 20 directs part of the incoming light image onto an optical scanner 22. In the preferred embodiment of FIG. 1, such scanner has the form of a rotatable prism 23 which has a multitude of reflecting mirror surfaces 24.

Image impressions projected onto the scanner 22 are reflected in the direction of the arrow 26 onto and partially through an apertured mask 27. The aperture 28 of the mask 27 is so dimensioned and positioned that a bank 30 of photocells (see FIGS. 1 and 2) receives a line element of the incoming image.

A drive 32 rotates the scanning prism 23, such as in the direction of the arrow 33. In this manner, the prism 23 is caused to operate as a line scanner since the bank 30 of photocells will incrementally receive the result of a line-by-line scan of the incoming image. In practice, there need be no pause between adjacent scan lines. Rather, the photocell bank 30 may be exposed to a narrow elemental band of the incoming image which sweeps such image from the point of view of the photocell bank 30 as each mirror facet 24 of the rotating prism 23 intersects and travels past the beam 19.

As is best seen in FIG. 2, the photocell bank 30 comprises a plurality of photocells 35 which are located along a line that is parallel to the axis of rotation of the scanner 22. The photocells receive their luminous inputs through a lens 36 and a pair of conventional beam splitters 37 and 38.

The beam splitter 37 serves the purpose of projecting visually observable indications of potential underexposure into the optical image that is observed by the photographer's eye 16. To this end, the exposure meter 10 includes a bank 40 of conventional signal lamps 41 which are individually lit upon the sensing of a potential underexposure by a corresponding photocell 35 in the bank 30.

A color filter 43 is positioned adjacent the bank 40 of lamps 41, and an elongate lens 44, similar in configuration to the elongate lens 36 (see FIGS. 1 and 2) is located adjacent the color filter 43 to project indications of potential underexposure by way of the beam splitter 37, and scanner 22 into the optical image observed by the photographer. To this end, a first-surface mirror 46 is positioned adjacent the beam splitter 20, so that luminous impressions which traverse the beam splitter 20 from the scanner 22 are reflected upon themselves back onto the beam splitter 20 and from there into the optical image observed by the photographer's eye 16. According to the subject invention, areas of potential underexposure are not only shown as such in the observed optical image, but are located in that image substantially at a position which corresponds to the location of the particular area of underexposure in the scene being observed.

To indicate areas of potential overexposure, the exposure meter 10 according to FIGS. 1 and 2 includes a bank 48 of conventional signal lamps 49. The lamps 49 are individually lit when a corresponding photocell 35 in the bank 30 senses an instance of potential overexposure. A color filter 50 is located adjacent the lamp bank 48 to distinguish indications of potential overexposure from indications of potential underexposure. By way of example, the color filter 43 may be a blue filter, while the color filter 50 may be a red filter. In this manner, indications of potential underexposure appear in a blue color in the observed optical image, while indications of potential overexposure appear in a red color in such image. If desired, other color combinations or combinations of differently oriented arrows or symbols may be employed to display distinctive overexposure and underexposure indications to the photographer.

An elongate lens 52, which is similar in configuration to the elongate lens 36 (see FIGS. 1 and 2) is located adjacent the color filter 50 for a projection of indications of potential overexposure into the observed image by way of the beam splitter 38, scanner 22, beam splitter 20, and auxiliary mirror 46.

In a simplified version of the embodiment of FIGS. 1 and 2, each lamp 41 in the bank 40, and each lamp 49 in the bank 48 could have associated therewith its own individual photocell and its own lamp energizing circuit. In accordance with FIGS. 1 and 3, however, each corresponding pair of lamps 41 and 49 in the banks 40 and 48 has only one photocell 35 in the bank 30 associated therewith, and only one control 54 for selectively energizing either one or the other, or none, of the lamps 41 and 49.

As shown in FIG. 3, the photocell 35 of the particular photocell and lamp assembly is connected in series with a variable resistor 56 and a transistor 301 between a potential V and ground. The potential V is applied to a terminal 57 by a conventional battery or other source of direct current (not shown).

The photocell 35 is preferably of a photoresistive type, so that the potential of the junction point 59 between the photocell 35 and variable resistor 56 varies as a function of the degree of light exposure of the photocell 35. A Zener diode 60 is connected between the junction 59 and the base of a PNP transistor 61. The emitter-collector circuit of the transistor 61 is connected in series with the lamp 41 between the terminal 57 and ground. A second Zener diode 63 is connected between the junction 59 and the base of an NPN transistor 64. The emitter-collector circuit of the transistor 64 is connected in series with the lamp 49 between the terminal 57 and ground.

The junction 59 carries its maximum potential when the photocell 35 is completely dark. This potential progressively decreases to a minimum value as the photocell 35 is exposed to light which progressively increases to a maximum intensity level. Between these extremes of minimum and maximum light intensity, there is a range of light intensities which produce satisfactory photographic exposures. To the one side of such satisfactory range, there is a lower range of potential underexposure. To the opposite side of the satisfactory range, there is an upper range of potential overexposure.

The lower range of potential underexposure is reflected by voltages at the junction 59 which have values at and adjacent the maximum junction potential. The Zener diode 60 is so poled and dimensioned that the transistor 60 is turned on as long as the potential at the junction 59 is at a value which corresponds to an instance of potential underexposure of the photographic film in the camera. In this manner, the lamp 41 remains lit as long as the condition of underexposure remains. As the level of light exposure of the photocell 35 increases, a point is reached at which the light level of the incoming image would be sufficient for a satisfactory exposure. This, in turn, is reflected in a decrease of the potential at the junction 59 which will cause the Zener diode 60 to turn off the transistor 61 thereby extinguishing the underexposure indicating lamp 41.

Neither of the lamps 41 and 49 is thereafter lit as long as the photocell 35 is exposed to a light level from the incoming image which corresponds to a condition of satisfactory exposure of the film in the camera 12. The Zener diode 63 is so poled and dimensioned as to maintain the NPN transistor 64 in its off condition as long as the voltage levels at the junction 59 indicate either an instance of potential underexposure, or a condition of satisfactory exposure.

On the other hand, as the light levels received by the photocell 35 reach values that correspond to a condition of potential overexposure of the film in the camera 12, the potential at the junction 59 decreases to values which no longer permit the Zener diode 63 to maintain the transistor 64 in its off condition. Accordingly, the transistor 64 then turns itself on, thereby energizing the lamp 49 which is accordingly lit. In this manner, the lamps 41 and 49 respectively indicate instances of potential underexposure and overexposure and supply no indication when the potential exposure is within a satisfactory range.

What is a satisfactory exposure range depends, of course, on the speed of the particular film employed at the time in the camera 12 and on the camera exposure setting. The same is true with respect to potential underexposures and overexposures. The resistor 56 is, therefore, made variable to provide for adjustments of the ranges presently under discussion to the particular film speeds. A shaft 66 and knob 67 are shown in FIG. 1 as means for adjusting the setting of the variable resistor 56 to different film speeds. A pointer 68 on the knob 67 cooperates with markings 69 on the exposure meter housing for indicating the particular film speed adjustments that may be effected in a given exposure meter.

At this juncture, it is to be recalled that each photocell 35 with corresponding lamp 41 and lamp 49 will have a control 54 of the type shown in FIGS. 1 and 3. Accordingly, if there are, for instance, eight photocells as shown in FIG. 2, there will be eight controls 54 of the type shown in FIG. 3. In consequence, the shaft 66 shown in FIG. 1 will be ganged with the variable resistors 56 of all eight controls 54, so that all the controls will be set simultaneously for the particular film speed.

The illustrated preferred embodiment also includes exposure and trim controls which respond to averaged or integrated light values of the image or scene to be photographed.

By way of example and as shown in FIGS. 1 and 3, the exposure meter 10 has a photocell 303 which is broadly exposed to the scene to be photographed through a lens 304. Because of this broad exposure (as distinguished from a narrow or focused exposure to only a small portion of the scene), the cell 303 provides a signal which represents an anverage or integral of the light values of the image or scene to be photographed.

As shown in FIG. 3, the photocell 303 may be connected in series with a resistor 305 between the positive supply terminal 57 and ground. The signal provided by the photocell 303 appears at a junction 306 between the photocell 303 and resistor 305. That signal is applied to the base of the transistor 301 and, accordingly, controls the emitter-collector resistance of that transistor.

In that manner, the potential at the above mentioned junction 59 is a function of the average light values of the image or scene to be photographed, as well as a function of the film speed setting (resistor 56) and of the particular light values (photocell 35). The control provided by the photocell 303 may be common to the individual controls of all the photocells 35 and lamps 41 and 49.

The signal provided by the photocell 305 may also be employed to control the iris or variable aperture 308 of the camera 12 and an iris or variable aperture 309 of the exposure meter 10. Photoelectrically controlled irises or apertures are well known in the photographic equipment field and have been used for many years.

As indicated in FIG. 1, the photocell 303 controls the opening of the apertures 308 and 309 through conventional electromechanical actuators 312 and 313, respectively. As indicated by a phantom line 314, the opening of the aperture 308 is also set in accordance with the film speed selected by the knob 67. Equipment for adjusting an aperture opening in accordance with a selected film setting and with a sensed light value is well-known and standard in many cameras. An example of the operation of the exposure meter 10 will now be given.

FIG. 4 illustrates an image as may be observed by the photographer's eye 16 when looking into the exposure meter 10 of FIG. 1. The image 72 of FIG. 4 has been drawn under the assumption that the scene to be photographed comprises a house 73 with walls 74, 75 and 76 and a roof 78. A door 79 and windows 80 are provided in the wall 75. The house 73 also has a garage 82 with a garage door 83. The garage door 83 is open at the particular time so that the dark interior of the garage 82 presents itself to the observer. The light conditions at the particular time are such that imaging of the dark interior of the garage 82 would lead to an underexposure of the film in the camera 12, while light reflections by the windows 80 would overexpose the film.

Neither the potential underexposure not the potential overexposure of the film would be indicated by a prior-art exposure meter which would look at the entire scene to be photographed. In the particular example illustrated in FIG 4, the areas of potential underexposure and the areas of potential overexposure would substantially balance each other from the point of view of a prior-art exposure meter that would look at the entire scene. On the other hand, a prior-art exposure meter that would look only at a small portion of the scene would, depending on its particular position, indicate either one of the areas of potential overexposure, or one of the areas of potential underexposure, or none of either of these areas.

By sharp contrast, the exposure meter of the subject invention scans the incoming image of the scene. At that time, the photocell 303 produces a signal which corresponds to the average or integral light values of the image 72 and which adjusts the apertures 308 and 309 and the potential at the junction 59 to that average or integrated values.

When the scanning operation reaches the level of the garage 82, a number (e.g. two) of the photocells 35 would receive a light level corresponding to an instance of potential underexposure. The controls 54 associated with the particular photocells 35 would, in turn, light the corresponding underexposure indicating lamps 42. Since the same scanner 22 handles the incoming image as well as the under and overexposure indications, the underexposure indications 85 provided by lamps 41 as just described and characterized, for instance, by a blue appearance, appear in the image 72 of the scene at locations which correspond to the locations of the image elements of the scene at which the particular instances of potential underexposure occur. The same is true with respect to indications 86 of potential overexposure which may, for instance, be characterized by a red appearance and which appear in the images of the windows 80 from which the cause of the particular overexposures emanated.

More specifically, when the operation of the scanner 22 relative to the photocell bank 30 reaches the level of the windows 80, a number (e.g. three) of the photocells 35 will receive a light level that is indicative of a potential overexposure of the film in the camera 12. In consequence, these photocells will cause their associated controls 54 to energize the corresponding lamps 48 thereby providing indications of potential overexposure. The scanner 22 thereupon cooperates with the lamps 48 in projecting the indications of overexposure in a spatially correct relationship into the image 72 of the scene.

In this manner, the photographer is apprized of the potential exposure quality of the picture he is desirous of taking. In the example of FIG. 4, several remedies would be available to the photographer for obtaining a satisfactory picture. First, he could close the garage door 83 in order to eliminate the dark background of the garage 82. He should then be able to adjust his camera so that the reflection by the windows 80 will no longer result in an overexposure. Alternatively, he may await more favorable light conditions or seek a more suitable object.

As far as the operation of the exposure meter shown in FIGS. 1, 2 and 3 is concerned, it will be recognized that the photocells 35 determine for different portions of each line scanned by the scanner 22 the presence of potential overexposures and potential underexposures. Each photocell 35 has indicating means 41 and 49 associated therewith for indicating, respectively, instances of potential overexposure and instances of potential underexposure. Each of these indicating means, comprising a lamp 41 and a lamp 49, has a location which corresponds to a location of its associated photocell 35 in the bank 30. In this manner, the scanner 22 is able to show the exposure indications at the spatially correct locations of the image 72.

In practice, the scanner 22 is operated at a sufficient speed to provide a presentation of all areas of potential overexposure and potential underexposure within a relatively brief period of time. The scanner 22, need, however, not operate as quickly as to present the indications in an uninterrupted fashion. To the contrary, the indications 58 and 56 may blink in the optical image 72 so that they will clearly stand out from similarly colored image elements.

In some situations, the photographer may wish to control the exposure analysis of a scene in a relatively slow fashion. For these cases, a knob 90 may be provided on the shaft of the scanning prism 23. The knob 90 is positioned so as to be accessible to the photographer who may thus rotate the knob 90 and thereby ascertain areas of potential over or underexposure. If desired, other manually operable drives for the scanner 22 may be provided in lieu of the knob 90 or in lieu of both the drive 32 and knob 90.

If a manually actuable device, such as the knob 90, is employed for ferreting out areas of potential over or underexposure, it is often desirable for the photographer to have an indication in the optical image 72 that informs him of the location which, at any given point of time, is subject to analysis. As shown in dotted outline in FIG. 2, a further signal lamp 93 with a mask 94 may, for instance, be located adjacent the bank 40 to provide a position indication of the type shown at 95 in FIG. 4 in the optical image 72. The lamp 93 is energized from a selectively actuable source of electric current 96. This source may, for instance, include a battery and a manually actuable switch (not shown) for selectively energizing the lamp 93. The mask 94 has a cutout 98 which forms the outline of the position indication 95.

As long as the lamp 93 is lit, the indication 95 will appear in the image 72 and will move therein in accordance with the movement of the scanner 22 so as to indicate the line or linear element of the scene that is at a particular type being analyzed by the photocell bank 30. Accordingly, if the photographer entertains a suspicion that a particular area of the scene would introduce a faulty exposure, he will light the lamp 93 and, in actuating the knob 90, will be guided to an adjustment of the scanner 22 which will provide an analysis of the particular scene area. If neither a blue nor a red indication appears in the image 72 while the position indication 95 points to the particular area, he will know that no faulty exposure would result from the luminous emanations of the corresponding scene areas.

The control shown in FIGS. 1 and 3 may be modified in several ways. For instance, the apertures 308 and 309 may be mechanically or electrically interconnected so that their adjustments are identical. A purely electro-optical control may be provided for the average setting by eliminating the transistor 301 and connecting the resistor 56 directly to the positive supply terminal 57 as indicated by the dotted line 318 in FIG. 3. In that case, the signal of the photocell 303 would act indirectly on the controls 54 by adjusting the aperture 309. This controls the light levels reaching the photocells 35 and thus the potential at the juncture 59.

Conversely, the aperture 309 and actuator 313 in the exposure meter 10 could be eliminated, and the electronic control provided by the photocell 303 and transistor 301 could be employed without the optical control provided by the aperture 309.

Moreover, as indicated by the phantom line 320 in FIG. 1, the aperture 308 could be controlled manually, such as in conjunction with an external exposure meter (not shown). In that case, the aperture 309 of the exposure meter 10 could be ganged with the aperture 308 of the camera. The photocell 303 may then be either eliminated, or used only for the electronic control shown in FIG. 3.

In some applications, cost and other considerations render the provision of banks of sensing and indicating elements and associated controls inadvisable. In accordance with further preferred embodiments of the subject invention, a single combination of sensing and indicating elements and requisite control circuit is employed in connection with an optical scanner which scans elemental areas of the scene, rather than elongate linear elements or lines.

Figure 6:
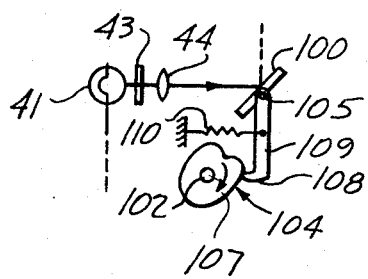
FIG. 6 is a view along line VI — VI of FIG. 5.
Figure 7:
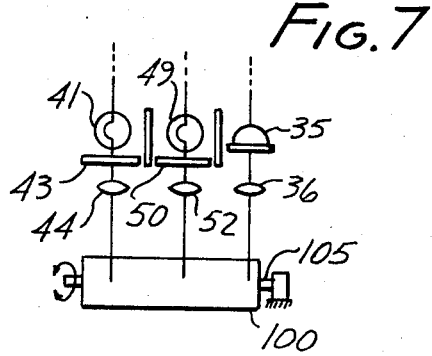
FIG. 7 is a view along line VII — VII of FIG. 5.

As shown in FIG. 5, 6 and 7, a modified scanner 122, which may be employed in lieu of the scanner 22 shown in FIG. 1, comprises the above mentioned rotating prism 23 together with a rocking mirror 100. The drive 32 which rotates the prism 33 also rocks the mirror through a right-angle gear 101 and shaft 102. A gear 104 between the shaft 102, driven through the gear 101, and the shaft 105 of the mirror 100 is provided for translating the rotary motion of the shaft 102 into a rocking motion of the shaft 105.

The gear 105, which is only indicated symbolically in FIG. 5, is shown in greater detail in FIG. 6. According to FIG. 6, a cam 107 is mounted on the shaft 102 to be rotated thereby. A cam follower 108 is coupled to the mirror axis 105 by a rocker arm 109. A spring 110 coupled to the rocker arm 109 maintains the cam follower in abutment with the cam 107.

The cam 107 may have any configuration which causes the mirror 100 to rock back and forth from an initial position to an advanced position and from such advanced position back to the initial position for one or more times during each revolution of the shaft 102. The initial and advanced mirror positions just mentioned are so chosen that the mirror 100 scans an entire line of the image during each mirror movement between initial and advanced positions. The gear 101 is, moreover, so dimensioned relative to the rate of rotation of the prism 23, that the mirror 100 scans several lines of each image being handled by the prism scanner 23. In this respect, it will be noted that the number of scanned lines per image increases with increasing step-up ratio of the gear 101.

As shown in FIGS. 6 and 7, use of the elemental image scanner 122 dispenses with all but a single photocell 35, a single underexposure indicating lamp 41, a single overexposure indicating lamp 94 and a single control 54. In other words, the photocell bank 30, and lamp banks 40 and 48, as well as the plurality of control circuits 54, are reduced to a single species of each kind. The color filters 43 and 50 in the apparatus of FIGS. 5 through 7 are reduced in lateral size relative to their counterparts in FIGS. 1 and 2. Similarly, circular lenses may be employed at 44, 52 and 36 in FIG. 7, instead of the elongate or cylindrical lenses provided at those positions in FIGS. 1 and 2. A first-surface mirror 113 is provided as shown in FIG. 5 to permit the photocell 35 to operate by way of the mirror 100 whereby the photocell 35 senses luminous impressions from successive portions of each scanned line.

As before, the underexposure indicator 41 is lit whenever the photocell 35 senses an instance of underexposure, while the overexposure indicator 49 is lit whenever the photocell 35 senses an instance of overexposure. Since the luminous signals provided by the lamps 41 and 49 are projected through the same scanner which exposes the photocell 35, it follows that each overexposure and underexposure indication in the image 72 will be located substantially in the image portion that corresponds to the region of the scene that, respectively, emanates insufficient or excessive light.

It will now be recognized that the scanner 122 with associated sensor 35 and indicators 41 and 49, as shown in FIGS. 5 through 7, may be employed in lieu of the scanner 22 and associated element banks 30, 40 and 48 in the exposure meter of FIGS. 1 and 2.

Figure 8:
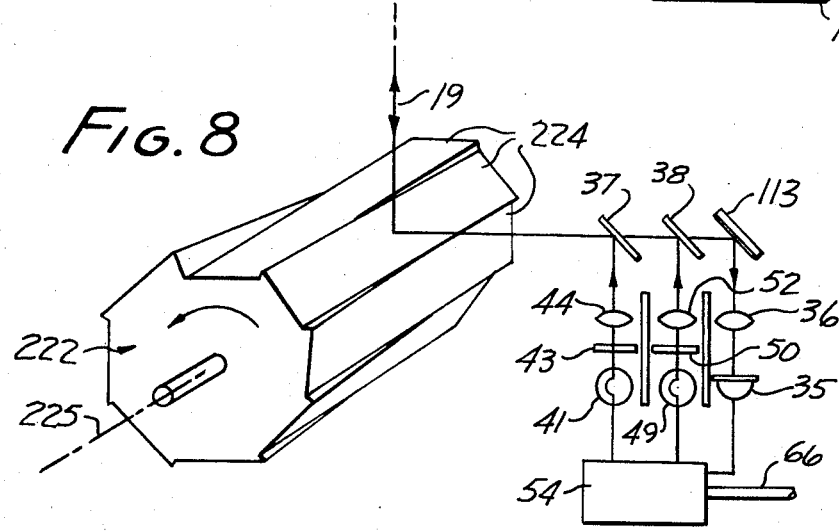
FIG. 8 is a diagrammatic view, partially in perspective, of a further modification of the exposure meter of FIG. 1.

A further preferred embodiment of the subject invention is shown in FIG. 8. In similarity to the embodiment of FIGS. 5 through 7, the embodiment of FIG. 8 again operates with a single photocell 35, underexposure indicator 41, overexposure indicator 49, and control circuit 54. According to FIG. 8, the scanning prism 22 of FIG. 1 is replaced by a scanning prism 222. The facets or mirror surfaces 24 of the scanning prism 22 of FIG. 1 extend in parallel to the axis of rotation of the scanning prism 22. In contrast thereto, the facets or mirror surfaces 224 of the scanning prism 222 of FIG. 8 extend at different angles to the axis of rotation 225 of the prism 222.

By way of example, one of the mirror surfaces 224 of the prism 222 may extend in parallel to the axis of rotation 225. A next succeeding mirror surface 224 may then extend at a small angle to the axis of rotation 225. The next succeeding mirror surface 224 may then extend at a somewhat larger angle to the axis of rotation 225. This angular increase of the longitudinal position of the mirror surfaces 224 relative to the axis of rotation 225 is continued from mirror surface to mirror surface around the prism 222.

Since each mirror surface 224 sweeps the vertical dimension of the incoming image, and since each mirror surface 224 is longitudinally tilted relative to the axis of rotation 225 at a different angle, it follows that each of these mirror surfaces will scan a different line in a substantially vertical direction of the incoming image of the scene to be photographed. This is easily seen if the single photocell 35 is viewed as a relatively stationary entity that only is exposed to a single image element at a time.

The scanner 222 of FIG. 8 is employed in lieu of the scanner 22 in the exposure meter of FIG. 1. As has already been indicated, this dispenses with the necessity of all but one photocell 35, underexposure indicator 41, overexposure indicator 49 and control circuit 54.

The desired resolution of analysis dictates the number of prism facets 224 and the degree of axial angular displacement between adjacent prism facets. Obviously, the resolution of analysis can be increased by decreasing the size of the angle of axial displacement among adjacent mirror surfaces. This, of course, calls for an increase in the number of mirror surfaces to assure a two-dimensional scanning of the entire scene during each revolution of the prism 222.

It may be helpful at this juncture to consider that the attainable resolution of analysis can be increased by a linear or preferably two-dimensional movement of the exposure meter during the scanning operation. For instance, if the exposure meter 10 only scans the scene coarsely in a pattern of mutually spaced lines, then exposure indications between such lines may be provided by slightly moving the exposure meter 10 so that a further scanning light pattern is interposed between the line pattern already mentioned.

We claim:

1. A photographic exposure meter, comprising in combination:
   first means for providing a visually observable optical image of a scene;
   second means operatively associated with said first means for analyzing said scene for predetermined light intensities; and
   third means operatively associated with said first and second means for providing in said optical image visually observable indications of presence and location of said predetermined light intensities in said scene.

2. An exposure meter as claimed in claim 1, including in said combination:
   fourth means operatively associated with said third means for controlling the provisions of said visually observable indications in accordance with an average light intensity of said scene.

3. An exposure meter as claimed in claim 1, wherein said second means include, in combination:
   fourth means for scanning said scene; and
   fifth means operatively associated with said fourth means for determining for each scanned portion of said scene the presence of a said predetermined light intensity; and
   said third means include sixth means connected to said fifth means and operatively associated with said fourth means for providing an indication of each determination of the presence of a said predetermined light intensity, and for projecting each determination by way of said fourth means into said optical image of said scene.

4. An exposure meter as claimed in claim 3, including in said combination:
   seventh means connected to said fifth means for adjusting the value of said predetermined light intensity in accordance with an average light intensity of said scene.

5. An exposure meter as claimed in claim 3, wherein:
   said fourth means include an optical line scanner;
   said fifth means include a plurality of sensing elements for determining for different portions of each scanned line the presence of a said predetermined light intensity; and
   said sixth means include, for each of said sensing elements, indicating means having a location corresponding to a location of its associated sensing element in said fifth means, and seventh means connected between each sensing element and corresponding indicating means for energizing the indicating means in response to exposure of the corresponding sensing element to a said predetermined light intensity.

6. An exposure meter as claimed in claim 3, wherein:
   said fourth means include an optical scanner for successively scanning elemental areas of said scene;
   said fifth means include a sensing element for determining for each scanned elemental area the presence of a said predetermined light intensity; and
   said sixth means include indicating means, energizing means for energizing said indicating means in response to exposure of said sensing element to a said predetermined light intensity, and means operatively associated with said indicating means and said optical scanner for projecting each indication provided by said indicating means into said optical image.

7. An exposure meter as claimed in claim 6, wherein:
   said optical scanner includes a rotating prism scanner.

8. An exposure meter as claimed in claim 6, wherein:
   said optical scanner includes first scanning means for successively scanning lines of said scenes, and second scanning means operatively associated with said first scanning means for scanning each of said lines.

9. An exposure meter as claimed in claim 6, wherein:
   said optical scanner includes a rotating prism scanner having progressively inclined prism faces.

10. A photographic exposure meter for presenting a spatial analysis of areas of potential overexposure and areas of potential underexposure, comprising in combination:
    first means for providing a visually observable optical image of a scene; and
    second means operatively associated with said first means for analyzing said scene for first areas of potential overexposure and for second areas of potential underexposure, and for providing in areas of said image corresponding to said first areas of said scene visually observable indications of potential overexposure, and in further areas of said image corresponding to said second areas of said scene visually observable indications of potential underexposure.

11. An exposure meter as claimed in claim 10, wherein said second means include in combination:
    third means for scanning said scene;
    fourth means operatively associated with said third means for determining for each scanned portion of said scene the presence of a potential overexposure and the presence of a potential underexposure; and fifth means connected to said fourth means and operatively associated with said third means for providing a first indication of each determination of the presence of a potential overexposure, and for providing a second indication of each determination of the presence of a potential underexposure and for projecting each first and second indication into said optical image by way of said third means.

12. An exposure meter as claimed in claim 11, wherein:

said third means include an optical line scanner;

said fourth means include a plurality of sensing elements for sensing for different portions of each scanned line the presence of potential overexposures and potential underexposures; and said fifth means include, for each of said sensing elements, first indicating means for indicating potential overexposures and second indicating means for indicating potential underexposures, each of said first indicating means and each of said second indicating means having a location corresponding to a location of their associated sensing element in said fourth means, and sixth means connected between each sensing element and its associated first and second indicating means for energizing the associated first indicating means in response to the sensing of a potential overexposure, and for energizing the associated second indicating means in response to the sensing of a potential underexposure.

13. An exposure meter as claimed in claim 11, wherein:

said third means include an optical scanner for successively scanning elemental areas of said scene;

said fourth means include a sensing element for determining for each scanned elemental area the presence of a potential overexposure and the presence of a potential underexposure; and said fifth means include first means for indicating potential overexposure, second means for indicating potential underexposure, energizing means for energizing said first indicating means in response to the sensing of a potential overexposure and for energizing said second indicating means in response to the sensing of a potential underexposure, and means operatively associated with said first and second indicating means and said optical scanner for projecting each indication provided by said first indicating means and each indication provided by said second indicating means into said optical image.

14. An exposure meter as claimed in claim 12, wherein:

said optical scanner includes a rotating prism scanner.

15. An exposure meter as claimed in claim 12, wherein:

said optical scanner includes first scanning means for successively scanning lines of said scenes, and second scanning means operatively associated with said first scanning means for scanning each of said lines.

16. An exposure meter as claimed in claim 12, wherein:

said optical scanner includes a rotating prism scanner having progressively inclined prism faces.

17. An exposure meter as claimed in claim 11, including:

means operatively associated with said third means for providing in said optical image an indication of the location which is being scanned by said third means at a particular time.

18. An exposure meter as claimed in claim 10, including in said combination:

third means operatively associated with said second means for controlling the provisions of said visually observable indications of potential overexposure and of said visually observable indications of potential underexposure in accordance with an average light intensity of said scene.

* * * * *